Aug. 19, 1924.
G. B. WARREN
1,505,924
SHAFT PACKING FOR ELASTIC FLUID TURBINES AND THE LIKE
Filed May 19, 1922
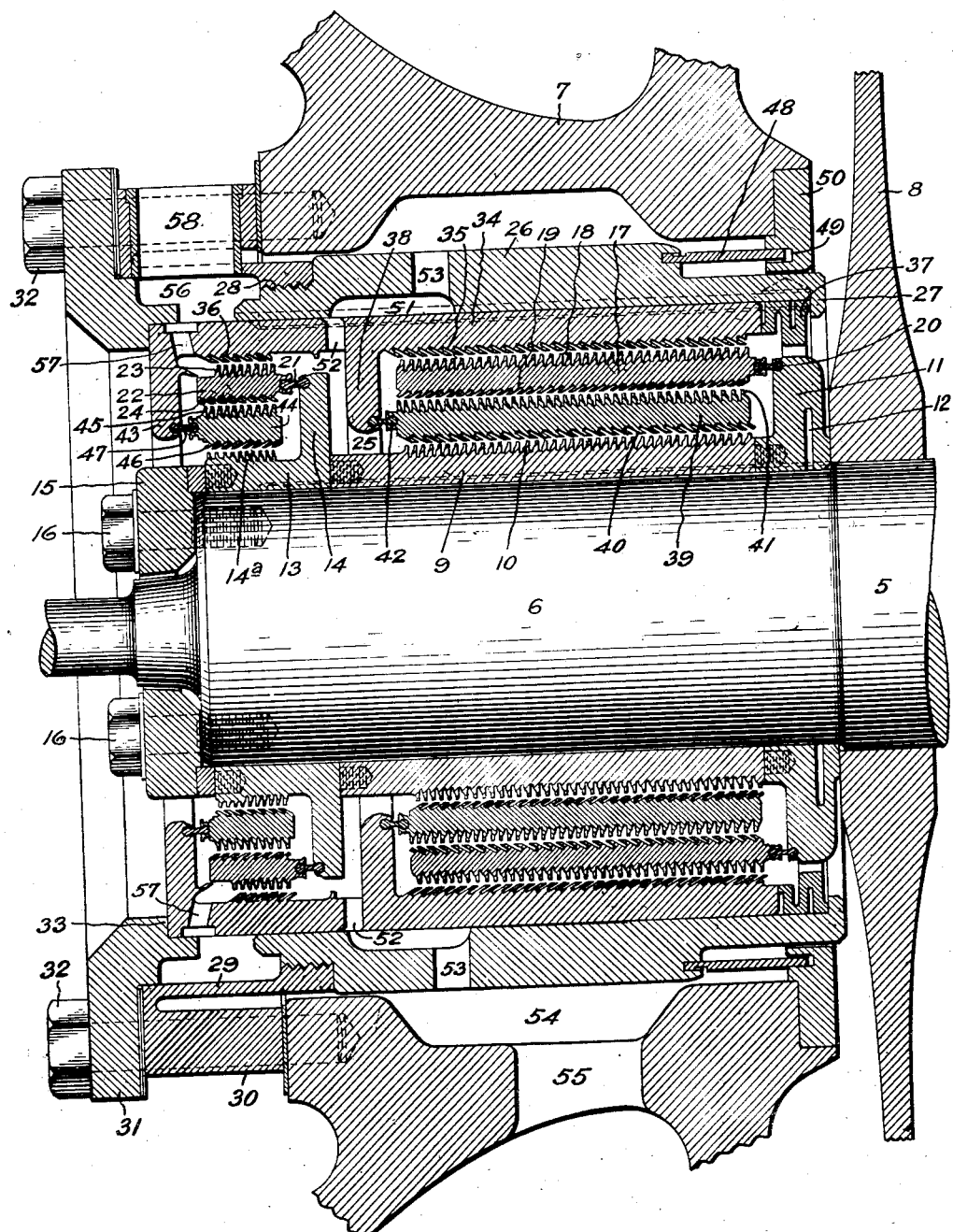
Inventor:
Glenn B. Warren,
by Albert E. David
His Attorney.

Patented Aug. 19, 1924.

1,505,924

UNITED STATES PATENT OFFICE.

GLENN B. WARREN, OF SCHENECTADY, NEW YORK, ASSIGNOR TO GENERAL ELECTRIC COMPANY, A CORPORATION OF NEW YORK.

SHAFT PACKING FOR ELASTIC-FLUID TURBINES AND THE LIKE.

Application filed May 19, 1922. Serial No. 562,159.

*To all whom it may concern:*

Be it known that I, GLENN B. WARREN, a citizen of the United States, residing at Schenectady, in the county of Schenectady, State of New York, have invented certain new and useful Improvements in Shaft Packings for Elastic-Fluid Turbines and the like, of which the following is a specification.

The present invention relates to packings such as are used to prevent the leakage of elastic fluid between two concentric relatively rotating elements, and particularly to packings of the labyrinth type. One application of my invention is in connection with elastic fluid turbines and in this specification I specifically illustrate and describe my invention applied to this use. It will be understood, however, that the invention is not necessarily limited to this particular application.

With the advent of turbines utilizing elastic fluid of higher pressures and superheats the providing of suitable packings particularly for the high pressure ends of the machines has become increasingly difficult. The higher pressure requires larger packings in order to keep down the leakage which means larger packing parts, and the higher superheat means that the packing parts are subjected to higher temperatures and greater variations in temperature thereby tending to distort the parts due to expansion and contraction. If the parts distort, the packing surfaces get out of alinement, so they open up at some points to permit undue leakage and rub at other points wearing away the packing edges. This results in destroying the efficiency of the packing. Also, in larger turbines such as are now coming into use the shafts required are of greater diameter which makes a greater packing area and requires larger packing parts.

The object of my invention is to provide an improved structure and arrangement in a packing of the labyrinth type which will give good packing efficiency, will be small and compact and will maintain its alinement even under the most severe operating conditions.

For a consideration of what I believe to be novel and my invention, attention is directed to the accompanying description and the claims appended thereto.

In the drawing, the figure is a sectional view of a packing embodying my invention.

Referring to the drawing, 5 indicates a rotating shaft, such as a turbine shaft, provided with a reduced end 6 which carries the rotating part of the packing, and 7 indicates a casing or housing which is supported on the end of the turbine casing and carries the stationary part of the packing. The first stage wheel of the turbine is indicated at 8. The rotating part of the packing comprises a sleeve 9 fixed on shaft end 6 as by being shrunk and keyed thereon, and provided on its outer surface with radially projecting annular packing teeth 10. Between the inner end of sleeve 9 and the hub of wheel 8 is an axially yieldable member 11 shown in the form of a ring which fits shaft end 6 and is provided with an annular groove 12, thus forming in substance a ring U-shaped in cross section, the open side of the U facing toward the shaft. Ring 11 provides a flange at the inner end of sleeve 9. At the outer end of sleeve 9 is a sleeve 13 having a radially extending flange 14, and annular packing teeth 14$^a$ similar to teeth 10 on sleeve 9. Sleeves 9 and 13, which form in substance one continuous sleeve structure, and ring 11 are held on shaft end 6 by a plate 15 fixed to the end of the shaft by bolts 16. Sleeves 9 and 13 and ring 11 are thus firmly held in an axial direction between the hub of wheel 8 and plate 15. Yieldable ring 11 will permit slight axial movement of sleeves 9 and 13 along shaft end 6 due to unequal expansion and contraction, while at the same time maintaining the sleeves and ring tightly in engagement with each other. Fastened to ring 11 and projecting axially therefrom is a cylindrical sleeve 17 provided with radially projecting annular packing teeth 18 on its outer surface and angularly projecting annular packing teeth 19 on its inner surface, the teeth 19 sloping in a direction opposite to that in which the leakage steam flows. Sleeve 17 is fixed to ring 11 by an annular expansion ring 20 which has one edge fastened to sleeve 17 and the outer edge to ring 11. Fastened to flange 14 by an expansion ring 21 is an axially extending sleeve 22 similar to sleeve 17 and provided with packing teeth 23 and 24 on its outer and inner surface respectively which are similar to packing teeth 18 and 19. It will be seen that packing sleeves 9 and 17 are concentric and that packing sleeves 13 and 22 are concentric and that they form two sets of packing sleeves spaced axially apart, the annular space formed between them being indicated at 25. These two sets of packing sleeves form the rotating part or element of the packing.

The stationary part of the packing comprises a shell 26 provided at its inner end with an inwardly projecting annular shoulder 27. The outer end of shell 26 is threaded on its outer surface as indicated at 28 and engaging therewith is one end of a yielding cylindrical ring 29, the other end being connected to a ring 30. In the present instance ring 29 is shown as being formed integral with ring 30 and also concentric therewith so as to economize in axial length. Ring 30 is located between the end of casing 7 and an end ring 31, the two rings being fastened in position by bolts 32. Ring 31 is provided with a shoulder 33 between which and the shoulder 27 is a stationary packing sleeve 34 provided with two sets of packing teeth 35 and 36. Between the inner end of sleeve 34 and shoulder 27 is axially yieldable bushing 37 somewhat similar to ring 11 and performing the same function. It comprises a ring having annular grooves cut in it to make it axially yieldable. On packing sleeve 34 intermediate between its ends is an inwardly projecting flange 38 which lies in annular space 25 and carries at its end a packing sleeve 39 having packing teeth 40 on its inner surface and packing teeth 41 on its outer surface. Packing teeth 40 slope in a direction opposed to the leakage flow and cooperate with packing teeth 10. Packing teeth 41 are straight and cooperate with packing teeth 19. Packing sleeve 39 is fastened to flange 38 by means of an expansion ring 42. At the outer end of packing sleeve 34 is a flange 43 which carries a packing sleeve 44 having straight packing teeth 45 on its outer surface which cooperate with packing teeth 24 and sloping packing teeth 46 on its inner surface which cooperate with packing teeth 14ª. Packing sleeve 44 is fastened to flange 43 by an expansion ring 47. It will be seen that the stationary packing structure embodies a set of packing sleeves comprising the inner portion of sleeve 34 and sleeve 39 and a second set of packing sleeves comprising the outer portion of sleeve 34 and sleeve 44.

Shell 26 is positioned in spaced relation to the inner surface of housing 7. Its outer end is held yieldingly in such position by ring 29 and its inner end is held yielding in such position by a cylindrical ring 48 one end of which is fastened to shell 26. The other end fits in a groove 49 formed in a ring 50 fixed to casing 7. The outer surface of ring 48 bears against the surface of groove 49 to form a leakage tight joint. By this arrangement shell 26 is yieldingly fixed to casing 17 so it may expand freely both radially and axially. At the same time however, it is held concentric with the shaft and rotating parts of the packing.

In the inner surface of shell 26 is a recess which forms with the outer surface of sleeve 34 an annular chamber 51 connected by passages 52 to annular space 25. Chamber 51 is connected also by a suitable number of holes 53 to an annular chamber 54 in housing 7. Leading from chamber 54 is a conduit 55 which may convey leakage elastic fluid to a point of intermediate pressure in the turbine, this being a known arrangement.

Between the inner edge of ring 31 and the end of shell 26 is an annular chamber 56 connected by holes 57 to a point in the packing just beyond packing teeth 23 and 36. Leading from chamber 56 is a discharge conduit 58 which conveys the low pressure elastic fluid to atmosphere or other suitable point. The end of conduit 58 extends through ring 29 and makes a sliding fit therewith so as not to interfere with radial expansion or movement of such ring.

The packing illustrated is a high pressure packing, the direction of leakage being from the inner end, i. e., the end adjacent wheel 8, outward. The leakage elastic fluid flows first outwardly between packing teeth 18 and 35, then back between packing teeth 19 and 41 and then outwardly between packing teeth 10 and 40 to chamber 25. As the leakage elastic fluid flows through the packing sections its pressure is broken down so that it enters chamber 25 at a pressure which may be but little above atmospheric. The most of the elastic fluid from chamber 25 is led away by conduit 55. The remainder passes through the space between packing teeth 23 and 36 and out through conduit 58. Packing teeth 24 and 45, and 14ª and 46 prevent leakage of air to chamber 56 or leakage of elastic fluid from chamber 56 directly out of the end of the packing. In any event, no air will leak through to chamber 25 and pass out through conduit 55.

Shell 26 which carries the stationary packing sleeves is yieldingly supported on casing 7 and packing sleeves 39 and 44 are yieldingly connected to shell 26 by expansion rings 42 and 47. Likewise, sleeves 17 and 22 are yieldingly connected to the parts which carry them. This arrangement permits all the packing sleeves to expand and contract radially in response to temperature changes while at the same time maintaining them concentric and maintaining the same clearance. Since the packing teeth do not interleave the sleeves can adjust themselves axially relatively to each other without impairing the effectiveness of the packing.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a packing, the combination of a shaft, a sleeve fixed on the shaft and provided with packing teeth on its outer surface, means providing a flange at one end of said sleeve, a second sleeve yieldingly connected to said flange in spaced relation to said first-named sleeve, a surrounding stationary housing, a sleeve attached thereto, and provided with a flange adjacent one end and packing teeth on its inner surface, a sleeve yieldingly connected to such flange and located between the two first-named sleeves, and packing teeth on both sides of said yieldingly supported sleeves which cooperate with each other and with the teeth on the other sleeves.

2. In a packing, the combination of a shaft, a sleeve structure thereon provided with spaced flanges, a surrounding stationary housing, a sleeve structure thereon provided with spaced flanges which lie parallel to said first-named flanges, axially-extending concentric sleeves yieldingly connected to said flanges, and packing teeth on adjacent surfaces of said sleeves.

In witness whereof, I have hereunto set my hand this 18th day of May 1922.

GLENN B. WARREN.